May 12, 1925. 1,537,068
F. A. CROSELMIRE
RING AND METHOD OF MAKING SAME
Filed March 23, 1921
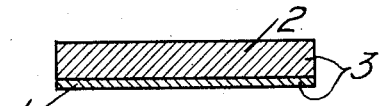
Fig. 1.
Fig. 2.
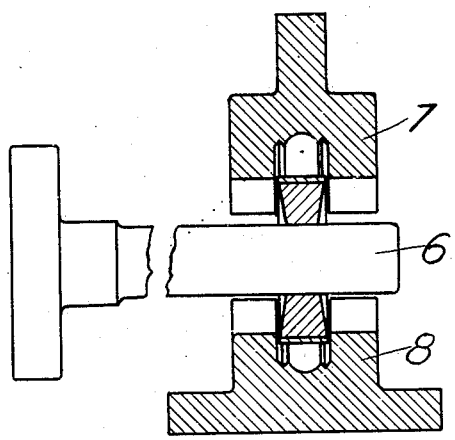
Fig. 7.
Fig. 3.
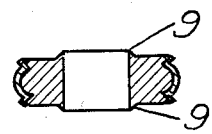
Fig. 8.
Fig. 4.
Fig. 9.
Fig. 5.
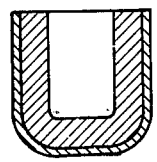
Fig. 6.
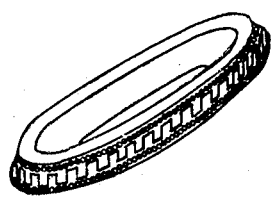
Fig. 10.
INVENTOR
Frederick A. Croselmire,
BY
ATTORNEY Patented May 12, 1925.

1,537,068

UNITED STATES PATENT OFFICE.

FREDERICK A. CROSELMIRE, OF NEWARK. NEW JERSEY, ASSIGNOR, BY MESNE ASSIGNMENTS, TO R & H PLATINUM WORKS, INC., OF NEW YORK, N. Y., A CORPORATION OF NEW JERSEY.

RING AND METHOD OF MAKING SAME.

Application filed March 23, 1921. Serial No. 454,709.

*To all whom it may concern:*

Be it known that I, FREDERICK A. CROSELMIRE, a citizen of the United States, and resident of Newark, in the county of Essex and State of New Jersey, have invented certain new and useful Rings and Methods of Making Same, of which the following is a specification.

This invention relates to rings and methods of making the same, especially finger rings and in particular to seamless composite finger rings manufactured from two or more metals.

I shall describe my invention as applied to the manufacture of finger rings in which the two dissimilar metals are respectively platinum and gold, and in which the exterior platinum is formed into an ornamental design. The application of my invention, however, is not restricted to rings composed of these two metals and I do not wish to limit myself to the conditions set forth in the following example further than is required by the appended claims. By this invention a composite drawn seamless finger ring is provided which can be fashioned to any desired shape and decorative contour, the platinum usually being outside, without causing separation between the metals or objectionable thinning out of the platinum outside.

In the accompanying drawings,

Figure 1 represents a composite plate of gold and platinum,

Figures 2, 3, and 4 represent the progressive steps in forming the said composite plate into a cup, Figure 5 represents the rings cut from said cup, Figure 6 represents the said rings after they have been trimmed preparatory to forming, Figure 7 represents the ring on the mandrel ready to be formed in the dies, Figure 8 represents the ring after forming, Figure 9 represents the ring after removal of excess metal squeezed out from the dies, and Figure 10 represents one form of the finished ring.

To practice my invention in the preparation of rings of the type illustrated above, I first prepare a sheet of platinum 1, of commercial purity, or sometimes alloyed. as with iridium, of about .017" thick. I then secure, preferably by welding, this sheet of platinum 1 to a sheet of gold 2 of the desired fineness, for example 14 to 18 K and about ¼" thick.

I then roll the composite plate 3 thus formed to the desired thickness which should be about 0.110" for finger rings of ordinary size and weight. In this rolling, the gold and platinum are both reduced in thickness, the gold relatively more than the platinum. The sheet is then annealed and discs about 1" in diameter are punched therefrom. These discs are then cupped in a drawing press as shown in Figures 2, 3, and 4, so that the gold 2 will be inside the platinum 1. Ordinarily the piece must be annealed after each drawing, and especially after the last drawing to prepare it for shaping in the dies.

From the cup, Figure 4, I next cut rings 4, as shown in Figure 5. These rings 4 may be of any desired width, for example 0.125". Next I trim the inside of the ring 4 by bevelling the cut surfaces 5 of the inner portion 2 inwardly as shown in Figure 6 to prepare the ring 4 for the forming process. The amount of metal which must be removed from the inside of the ring 4 varies with the shape into which the outside surface of the ring 4 is to be formed. In case the configuration of the outside of the ring 4 is deeply indented, then a relatively large amount of metal should be trimmed from the inside of the ring. In case the shape of the outside of the ring 4 is to be changed only a little during the forming, then only a little metal should be trimmed from the inside of the ring. In any case a slight excess of metal is desirable over and above that required to completely fill the dies 7 and 8; if too little metal is removed prior to forming, then an unduly large amount of forming is required in order to bring the dies 7 and 8 together, and in consequence the platinum layer becomes too thin.

The ring 4, after being trimmed to the form shown in Figure 6, is placed on a mandrel 6 within a pair of dies 7 and 8, and formed in a foot press or other suitable machine until the ring 4 conforms to the shape of the dies. During the forming process the mandrel 6 is rotated after each blow, so that the line formed by the junction of the upper and lower die blocks 7 and 8 does not leave any mark on the periphery of the ring 4. The shape of the periphery of the ring 4 is determined by the form of the dies 7 and 8 which are prepared to produce the desired configuration. When the outside metal 1 is very rare, as with platinum, and it is desirable to use only a very thin plate of it, this process of shaping in the die will leave the thickness of the outer layer substantially uniform, so that none of the rarer metal will be wasted in unequal distribution, and the inner metal 2 will not punch through.

The result of thus shaping the ring 4 on dies 7 and 8 is not only to improve the ornamental appearance of the ring 4, but to cause the inner and outer sections 2 and 1 respectively to interlock and thereby strengthen the bond between the welded surfaces.

After forming, the excess metal 9, as shown in Figure 8 is removed, and the final blank 10, as shown in Figures 9 and 10, is finished by knurling, chasing, engraving, buffing, or other known methods.

The process above set forth may be employed with metals other than gold and platinum, and is not limited to combinations of only two metals, but may be carried out with three or more metals. Likewise the plates of which the rings are to be formed may be made by brazing or soldering where the nature of the component metals so admits. Shaping in the dies is ordinarily accomplished by hammering, but other well known means, such as hydraulic pressure may be employed where desirable.

What I claim is:

1. A seamless ring comprising a band of one metal and a much thinner peripheral band of a dissimilar metal molecularly united, pressed into the first-named band and of substantially uniform thickness, the top and bottom faces in the plane of the ring being of the first mentioned metal except along their peripheries.

2. The process of shaping rings, which consists in bevelling the inner edges of the ring sufficiently to allow the flow of said ring under pressure, mounting the ring upon a mandrel, and forcing the ring into dies by pressure exerted in the plane of the ring while the same is on said mandrel.

3. A seamless ring drawn from flat material, composed of gold on the inside and platinum united to the gold on the outside, the platnum being forced into the gold to give an ormanetal appearance.

4. The method of making finger rings which consists in welding two sheets composed of different metals, forming into a tube the said composite sheet, cutting said tube into rings, trimming off the inside of said rings, forming the inner and outer surfaces of said ring into suitable shape by hammering in a pair of dies, the blows being exerted in the plane of the ring, trimming off the excess metal, forming an ornamental design on the exterior surface substantially as described.

5. The method of making finger rings which consists in welding two sheets composed of gold and platinum, forming into a tube the said composite sheet, cutting said tube into rings, trimming off the inside of said rings, forming the inner and outer surfaces of said ring into suitable shape by hammering in a pair of dies, the blows being exerted in the plane of the ring, trimming off the excess metal, forming an ornamental design on the exterior surface substantially as described.

6. The process of making composite seamless rings which comprises uniting dissimilar metals and forming a seamless ring having inner and outer metal portions of dissimilar metals, indenting the outer ring in dies after first removing enough of the inner ring to fill the dies on completion of the indenting operation.

7. The process of making composite seamless rings which comprises uniting dissimilar metals and forming a seamless ring having one metal inside and the other outside, stamping the ring in dies, after first removing enough of the inner metal ring portion to allow said inner metal to expand and fill the dies as the outer ring is indented without making the outer portion substantially thinner.

8. The process of making a ring which comprises joining a thin layer of a metal including platinum with a much thicker layer of a softer metal, forming a seamless ring with the thin layer outside, shaping the inner layer of softer metal to permit its lateral deformation, placing the ring on a mandrel, and forming configurations on the thin layer and periphery of the softer metal, whereby the tendency of the outer layer to become still thinner is reduced by the deformation of the softer metal.

Signed at New York, in the county of New York and State of New York this 18th day of March, A. D. 1921.

FREDERICK A. CROSELMIRE.